Aug. 30, 1938.   R. E. QUINN   2,128,266
AUTOMATIC AIRSHIP VALVE REGULATOR
Filed May 18, 1937   2 Sheets-Sheet 1

INVENTOR
RALPH E. QUINN
BY
ATTORNEYS

Aug. 30, 1938.     R. E. QUINN     2,128,266
AUTOMATIC AIRSHIP VALVE REGULATOR
Filed May 18, 1937     2 Sheets-Sheet 2
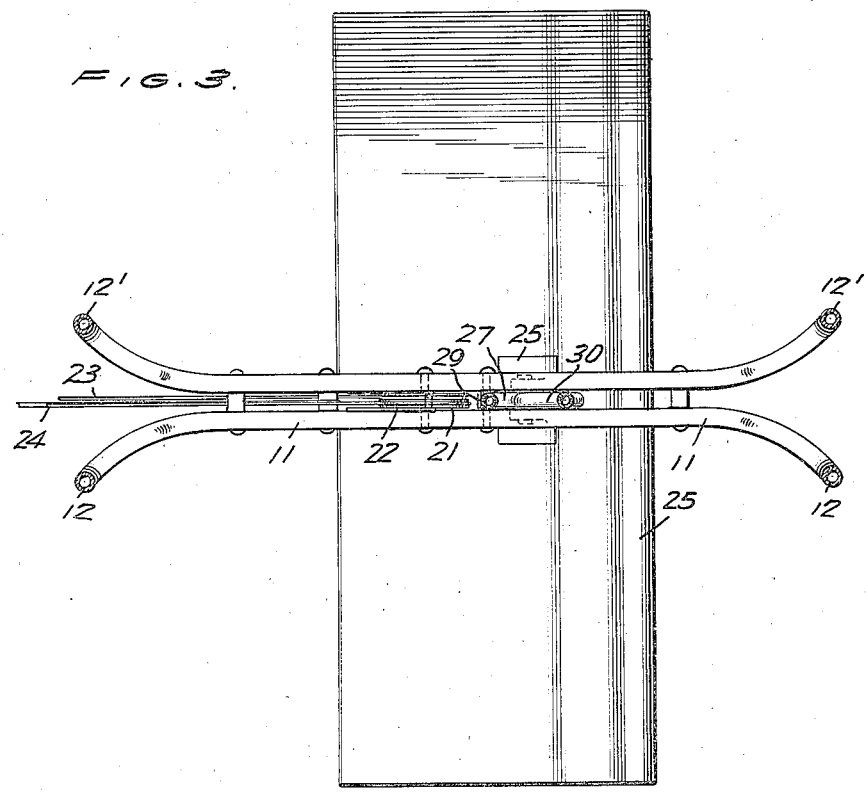
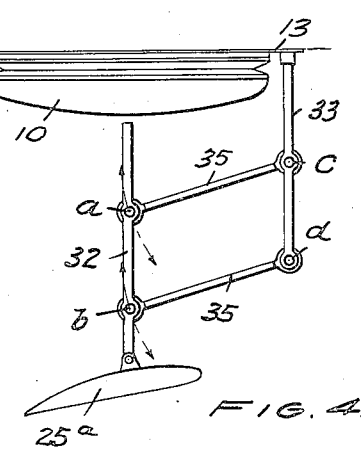
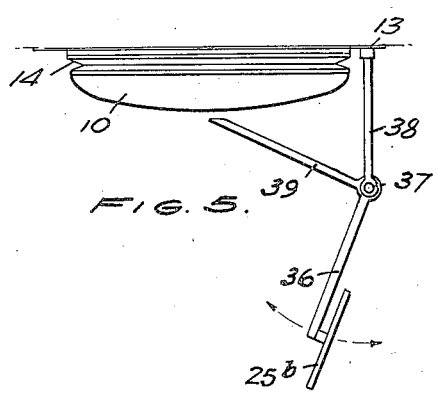
INVENTOR
RALPH E. QUINN
BY
ATTORNEYS Patented Aug. 30, 1938

2,128,266

UNITED STATES PATENT OFFICE 2,128,266

AUTOMATIC AIRSHIP VALVE REGULATOR

Ralph E. Quinn, Moffett Field, Calif.

Application May 18, 1937, Serial No. 143,323

16 Claims. (Cl. 244—99)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to valves but more particularly to automatic air or gas valves of the type fitted to the envelope, ballonet, or gas cell of an aerostat for the release of air to prevent excessive internal pressure. These valves may be operated manually or they can be set to open automatically at a predetermined pressure within the ballonet or gas cell.

It not infrequently happens, however, that during flight the flow of air over the valve produces a suction which tends to pull the valve open at times when no release of air or gas from inside the gas envelope or ballonet is desired. The present invention is designed to prevent this undesirable condition and with this object in view it provides an automatic airship valve regulator which, briefly, consists of a small airfoil or plate attached to the automatic airship valve in such a manner that the lift, or lift and drag, produced on the airfoil or plate in flight tends to hold the valve in a closed position.

Other objects and advantages of the invention may be apparent from the following detailed description thereof and from the accompanying drawings, wherein:

Figure 3 is a horizontal section taken on line 3—3 of Figure 1.

Figure 4 is a view of a modified form of the invention, showing an optional method of attaching the regulator to the valve, and Figure 5 is a view of a further modification of the invention.

Figure 1:
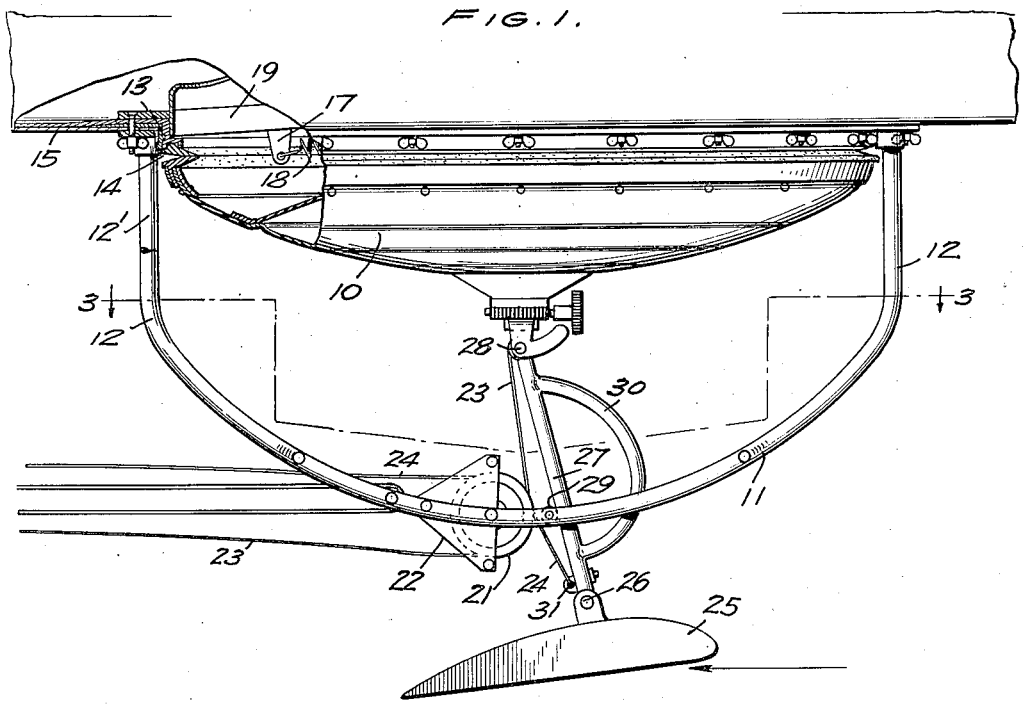
Figure 1 is a view, partly in elevation and partly in section, of a conventional automatic airship valve with the invention applied thereto, the valve being shown in closed position.

The automatic valve construction illustrated in the drawings is conventional and consists, briefly, of a disk-like dome valve 10 caged for vertical sliding movement within a yoke or frame 11 having flaring legs or bifurcations 12—12' bolted or otherwise secured to ring 13 of the annular valve seat 14, the latter being fitted to and secured within a circular aperture in the fabric 15 of the envelope, ballonet or gas cell of the aerostat. The valve 10 is pendently supported for straight-line movement to and from the valve seat 14 by means of a valve-closing mechanism. This mechanism is composed of a series of bell-crank levers, each of which has a long arm (not shown) connected by a link 16 with the inner side of the valve 10 and a short arm 17 connected to the valve seat structure by an adjustable helical contractile spring 18 which is tensioned to hold the valve to its seat. Each bell crank lever is pivotally mounted on an arm 19 of a spider which forms part of the valve seat structure and which has a central hub or guide bearing (not shown) for the valve stem 20. The valve 10, when seated, is exposed on its outer side to the pressure of the atmosphere and on its inner side to the pressure with the envelope. Normally, it is automatically opened for the relief of pressure inside the envelope by the difference in pressure between that inside the envelope and that of the atmosphere; the adjustment of the tension of the springs 18 determining the pressure difference at which the automatic valve operates. As soon as equilibrium of pressure difference is reestablished by the relief of pressure inside the envelope the springs 18 move the valve quickly to closed position. The valve, in addition to being operated automatically, is also adapted to be moved by manually operated mechanism. The manually operated mechanism embodies guide pulley 21 supported by the yoke 11 for rotation about a horizontal axis and partly enclosed within a pulley housing 22. This pulley serves as a guide for the operating cables 23 and 24.

The above described valve construction, automatic valve operating mechanism, and the manual operating mechanism are conventional and constitute no part of the present invention except in so far as they are necessarily modified and combined with the invention for attaining the desired end.

As previously stated, the object of the invention is to provide a device for counteracting the suction created, during flight, by the flow of air over the automatic valve 10 and to hold the valve closed against the tendency of the suction to pull the valve open. The device illustrated in Figs. 1 to 3 inclusive comprises a small body 25 designed to obtain a reaction from the relative motion of a fluid, such as air, with respect to the body and attached at 26 to the lower end of a lever such as a steel tube 27 which has its upper end hingedly connected at 28 to the valve 10 so that the body and the attaching tube are free to swing in the fore and aft direction of the yoke 11 which is parallel to the airflow. The attaching tube or lever 27 extends between the two components of the yoke, as shown in Figure 3, and rests against a roller bearing 29 on which it slides during the opening and closing movements of the valve 10. Roller bearing 29 is supported by the yoke 11 at a point slightly ahead or forward of the hinged connection 28, the latter being substantially at the axial center of the valve 10. Projecting forwardly of the attaching tube 27 is a curved steel tube 30 welded at its ends to the tube 27 so as to extend above and below the yoke 11 between which it is confined, as illustrated, to prevent the attaching tube 27 from turning about its longitudinal axis or swinging in a lateral plane. The connection at 26 between the body 25 and the lower end of the attaching tube 27 is such as to permit adjustment of the body 25 for changing its angle of attack. The body 25 may be either a small airfoil or a flat plate. It is preferably an airfoil, of Clark Y section, 24 in. span; 10 in. chord. The lift produced on the airfoil in flight tends to hold the valve 10 in closed position and when the flow of air over the valve produces a suction which tends to pull the valve open, this suction is counteracted by the lift of the airfoil. When the internal pressure increases sufficiently to cause the valve to open, the upper end 28 of the attaching tube 27 moves vertically downward and since the roller bearing 29 is located slightly ahead of the end 28 of the tube, a turning movement is imparted to the descending tube 27 which causes the lower end 26 thereof to be displaced forwardly in the arc of a circle, carrying with it the airfoil 25. The angle of attack of the airfoil is thus increased, producing an increased lift which returns the valve 10 to a closed position when the internal pressure is reduced sufficiently. To provide for manual operation of the valve 10, the valve-opening cable 23 is connected to the valve at 28 and the cable 24 is suitably connected near the lower end of the tube 27 as shown at 31.

Figure 2:
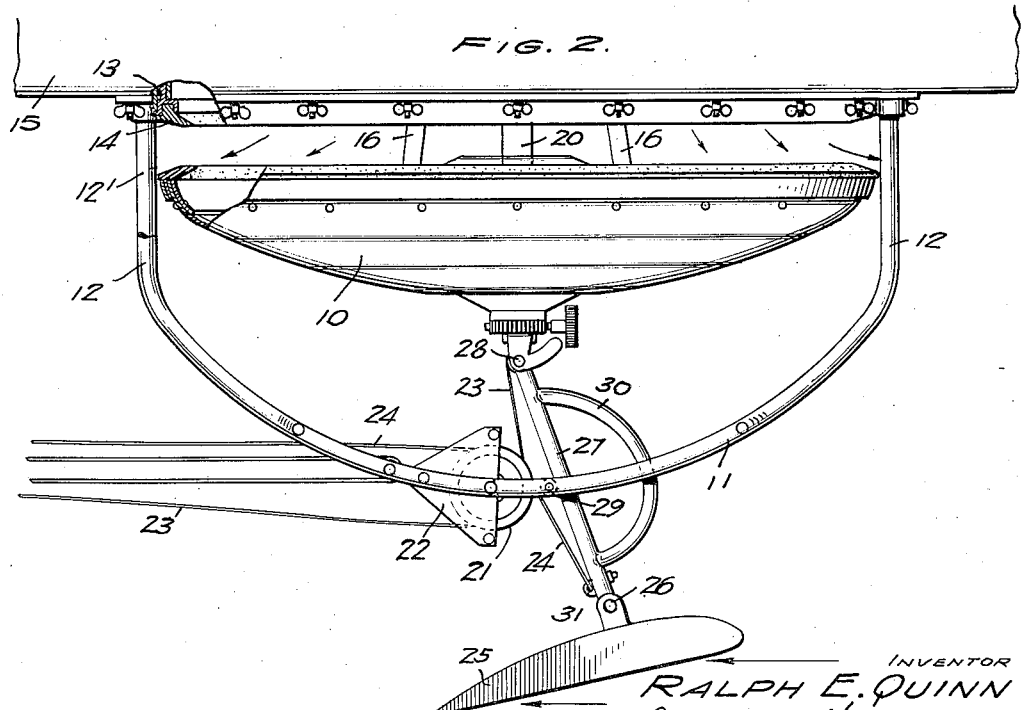
Figure 2 is a similar view with the automatic airship valve shown in open position.

In the construction of the automatic airship valve regulator disclosed in Figures 1 to 3 inclusive, the airfoil is attached to the movable valve 10. This is optional, however, and other methods of combining the regulator with the automatic valve are illustrated in Figures 4 and 5. In neither instance is the airfoil or plate attached to a moving portion of the automatic valve assembly.

In Figure 4 the airfoil body 25a is attached to a fixed portion of the automatic valve assembly, such as the valve seat ring 13, by a pair of vertically disposed parallel rods or tubes, 32 and 33, connected by two equal parallel cross links 34 and 35; the upper end of rod 33 being secured to the ring 13 and the airfoil being secured to the lower end of the rod 32. Links 34 and 35 are hinged to the rods at points a, b, c, and d so that movement of rod 32 relative to the fixed rod 33 is effected without destroying the parallelism of the rods and, hence, without changing the angle of attack of the airfoil. The arrangement of the mechanism is such that in flight the normal position of the parts is as shown in the drawings; the links 34 and 35 being inclined with their upper ends toward the wind. In addition to the lift of the airfoil 25a, the drag of the links produced in flight as a result of the downward inclination of the same is utilized as a valve closing force. As the valve 10 opens, this inclination increases and causes a greater surface or "flat plate area" of the links to be presented to the air stream with a resultant increase in the magnitude of the valve-closing force which, together with the lift of the airfoil 25a, returns the valve 10 to a closed position when the internal pressure is reduced sufficiently.

In Figure 5 a flat plate 25b is mounted on the lower arm 36 of a bell crank lever hinged at point 37 to the lower end of a short vertical rod 38 so that the upper arm 39 of the lever acts against the valve 10. Rod 38 is fixed at its upper end to the valve seat ring 13. The arrangement of the parts is such that when the plate 25b is at about 75 degree angle to the airflow the valve 10 is in a closed position, and with the valve in a wide open position the plate is at a 90 degree angle to the airflow. The drag produced on the plate in flight supplies the force to regulate the action of the valve.

The following table shows the comparative action of an automatic airship valve with and without airfoil.

| Air speed, M.P.H. | A. without airfoil | | B. with airfoil | | C. with airfoil | |
|---|---|---|---|---|---|---|
| | Opens | Closes | Opens | Closes | Opens | Closes |
| 0 | 1.8 | 1.5 | 1.2 | 0.9 | 1.2 | 0.9 |
| 30 | | | | | 1.3 | 1.1 |
| 40 | 1.8 | 1.5 | 1.4 | 1.2 | 1.4 | 1.1 |
| 50 | | | 1.5 | 1.25 | 1.45 | 1.2 |
| 60 | 1.5 | 1.2 | 1.7 | 1.4 | 1.5 | 1.25 |
| 65 | Held closed by closer | | 1.8 | 1.45 | 1.55 | 1.3 |
| 70 | | | 1.9 | 1.6 | 1.6 | 1.4 |

B. Airfoil set at 9 degree angle of attack-valve closed; 15 degree angle of attack-valve open.
C. Airfoil set at 8 degree angle of attack-valve closed; 14 degree angle of attack-valve open.

As shown in column "A", at speeds of 65 M. P. H. and above, the valve, without this device, must be held closed by the closer and must be operated manually.

As shown in columns "B" and "C", the valve, with this device, continues to function automatically at all speeds. And also, by proper adjustment of the angle of attack of the airfoil, a gradual increase of internal pressure is maintained as the speed of the airship is increased. This feature is especially desirable when the device is used on a non-rigid or semi-rigid type of airship.

Having thus described the invention, what I claim is:

1. In a valve construction, a valve subject to the suction action of fluid flow and capable of being unseated by such action and means exposed to the said fluid flow and designed to obtain reaction from the relative motion of the fluid with respect to said means to apply a closing force to the said valve.

2. In a valve construction, a valve subject to the suction action of fluid flow across one face thereof and capable of being unseated by such action and means tending to hold the said valve in a closed position, including a body exposed to the said fluid flow and designed to obtain reaction from the relative motion of the fluid with respect to the body to apply a closing force to the valve.

3. In a valve construction, a valve adapted to open at a predetermined static pressure difference between a confined pressure on one side thereof and atmospheric pressure on the opposite side, said valve being subject to the suction action of air flow on the atmospheric side thereof and capable of being unseated by such action; and suction-counteracting means tending to hold the valve in a closed position including a body exposed to the air flow and designed to obtain reaction from the relative motion of the air with respect to the body, and mechanism for transmitting the reaction force of the body to the valve to exert a closing force upon the latter.

4. A valve exposed on one side to the pressure of a confined fluid and on the opposite side to the pressure of an unconfined mobile fluid and arranged to open directly across the path of the mobile fluid, said valve having an attached surface disposed in the path of the unconfined fluid and designed to obtain and to transmit to the valve a reaction from the relative motion of the said fluid with respect to the said surface to apply a closing force to the said valve.

5. A valve exposed on one side thereof to fluid flow and opening directly across the path of the fluid and having an attached surface exposed to the fluid flow and designed to obtain and to transmit to the valve a reaction from the relative motion of the fluid with respect to the said surface to apply a closing force to the said valve, said surface being movable with the valve so that the opening of the valve varies the angular position of the surface relative to the fluid flow to obtain an increased valve-closing force.

6. An automatic airship valve regulator comprising a small airfoil or plate attached to an automatic airship valve and exposed to the airstream in such a manner that the lift or lift and drag produced on the airfoil or plate in flight tends to hold the valve in a closed position.

7. In an aerostat, a valve set to open automatically at a predetermined difference in pressure between that inside the aerostat and that of the atmosphere, and means connected with the valve and exposed to the airstream to obtain a reaction from the relative motion of the air with respect thereto for setting up a force to counteract the suction produced in flight by the flow of air over the valve which tends to pull the valve open.

8. A valve exposed on one side to fluid current and adapted to be unseated in the direction of its exposed side by a difference in pressure on the opposite sides of the valve and a body attached to the said valve and exposed to the fluid current to obtain a reaction from the relative motion of the fluid with respect to the body to apply a closing force to the valve and adapted to be moved about a fixed fulcrum by and upon the opening of the valve for increasing the reaction with a resultant increase in the closing force on the valve.

9. The combination with a gas filled buoyant body adapted to be propelled through a sustaining medium, of means for weighing the body to keep the forces of buoyancy and weight correctly related including a relief valve adapted to open at a predetermined pressure within the body, a member located within the sustaining medium and adapted to obtain a reaction from the relative motion of the medium with respect to the member, and an operative connection between the valve and the member for transmitting the forces of the reaction to the said valve to operate the latter.

10. In an aerostat, a spring-loaded relief valve fitted to the envelope—ballonet—or gas cell of the aerostat and set to open at a predetermined pressure for preventing excessive internal pressure, and means disposed in the airstream and designed to obtain reaction from the air through which it passes to apply a closing force to the said valve to counteract the suction produced in flight by the flow of air over the valve which tends to pull the valve open.

11. In an aerostat, a spring-loaded relief valve fitted to the envelope—ballonet—or gas cell of the aerostat and set to open at a predetermined pressure for preventing excessive internal pressure, and an airfoil disposed in the airstream and designed to obtain reaction from the air through which it passes to apply a closing force to the said valve to counteract the suction produced in flight by the flow of air over the valve which tends to pull the valve open.

12. In a valve construction, an automatic operating valve adapted to open under fluid pressure on one face thereof and having the opposite face exposed to the atmosphere, a lever having one end thereof hingedly connected to the said opposite face of the valve, and a body attached to the other end of the lever and adapted to be exposed to air flow to obtain a reaction from the relative motion of the air with respect to the body to apply a force to the valve counter to the direction of the fluid pressure acting against the valve.

13. In a valve construction, a valve adapted to be unseated with a straight line motion by a difference in pressure on the opposite faces of the valve, a lever having one end thereof hingedly connected to a face of the valve, a body attached to the other end of the lever and adapted to be exposed to fluid flow to obtain a reaction from the relative motion of the fluid with respect to the body to apply a force to the valve counter to the force unseating and tending to unseat the valve, and a fulcrum for the said lever fixed at a point between the body and the hinge of the lever and in advance of the line of motion of the valve to support the lever and the body at an inclination to the airflow.

14. An automatic airship valve regulator having, in combination, a valve seat fitted to and secured within a circular opening in the envelope of the airship, a cage secured to and depending from the valve seat, a disk-like dome valve confined within the cage for vertical sliding movement to and from the valve seat, a spring-tensioned valve closing mechanism connected to the valve to hold the latter in a closed position and adjustable to set the valve to open automatically at a predetermined pressure within the envelope, a roller supported by said cage, an airfoil exteriorly of the cage, an inclined lever extending inwardly and outwardly of the cage with its inner end hingedly connected to the said valve and with its outer end adjustably secured to the said airfoil, said lever having a slide bearing on the said roller for swinging and sliding movement in the direction of the normal airflow, and means on said lever for abutment with the cage to restrict the movement of the lever to the said direction.

15. The combination with a valve and its seat of an airfoil exposed to fluid flow and means operatively connecting the airfoil with the valve so that the reaction obtained from the relative motion of a fluid with respect to the airfoil is applied as a closing force to the said valve, the said means comprising a pair of laterally spaced parallel members coupled together for relative movement by a pair of laterally spaced equal-length parallel cross links maintaining the parallelism of the members, one of the members being fixed at one end to the valve and the other member having its corresponding end adapted to abut the valve and its opposite end connected to and supporting the airfoil, the said cross links being inclined to produce in flight a drag force supplementary to the valve-closing force of the airfoil.

16. The combination with a valve and its seat of a bell-crank lever connected to the valve seat for movement about a fixed axis with one arm of the lever disposed to abut the valve to move it against the valve seat and the other arm exposed to fluid flow, and a flat plate mounted on the said other arm of the lever to obtain a reaction from the relative motion of a fluid with respect thereto setting up drag forces turning the lever to apply a closing force to the said valve, the said plate being normal to the airflow in the wide open position of the valve and at a decreased angle to the airflow when the valve is in a closed position.

RALPH E. QUINN.